US011855690B2

(12) United States Patent
Saunders et al.

(10) Patent No.: US 11,855,690 B2
(45) Date of Patent: *Dec. 26, 2023

(54) SLOPING SINGLE POINT OPTICAL AGGREGATION

(71) Applicant: Microsoft Technology Licensing, LLC, Redmond, WA (US)

(72) Inventors: Winston Allen Saunders, Seattle, WA (US); Christian L. Belady, Mercer Island, WA (US); Lisa Ru-Feng Hsu, Redmond, WA (US); Hitesh Ballani, Redmond, WA (US); Paolo Costa, Redmond, WA (US); Douglas Carmean, Redmond, WA (US)

(73) Assignee: Microsoft Technology Licensing, LLC

( * ) Notice: Subject to any disclaimer, the term of this patent is extended or adjusted under 35 U.S.C. 154(b) by 82 days.

This patent is subject to a terminal disclaimer.

(21) Appl. No.: 17/536,405

(22) Filed: Nov. 29, 2021

(65) Prior Publication Data

US 2022/0368420 A1 Nov. 17, 2022

Related U.S. Application Data

(63) Continuation of application No. 16/917,829, filed on Jun. 30, 2020, now Pat. No. 11,476,934.

(51) Int. Cl.
*H04B 10/112* (2013.01)
*H04B 10/40* (2013.01)
(Continued)

(52) U.S. Cl.
CPC ......... *H04B 10/1123* (2013.01); *H04B 10/40* (2013.01); *H04B 10/516* (2013.01); *H04B 10/66* (2013.01)

(58) Field of Classification Search
CPC .. H04B 10/1123; H04B 10/516; H04B 10/40; H04B 10/66; H04B 10/11; H04B 10/112
See application file for complete search history.

(56) References Cited

U.S. PATENT DOCUMENTS

| 5,296,950 A | 3/1994 | Lin et al. |
| 8,659,895 B1 * | 2/2014 | Carlson .............. H05K 7/20745 361/695 |

(Continued)

OTHER PUBLICATIONS

Charidimos Chaintoutis ,"Free Space Intra-Datacenter Interconnects Based on 2D Optical Beam Steering Enabled by Photonic Integrated Circuits", Jan. 8, 2018,Photonics 2018, 5, 21; doi:10.3390/photonics5030021, www.mdpi.com/journal/photonics,pp. 1-8.*

(Continued)

*Primary Examiner* — Omar S Ismail
(74) *Attorney, Agent, or Firm* — RAY QUINNEY & NEBEKER P.C; James Bullough

(57) ABSTRACT

A system for using free-space optics to interconnect a plurality of computing nodes can include a plurality of optical transceivers that facilitate free-space optical communications among the plurality of computing nodes. The system may ensure a line of sight between the plurality of computing nodes and the optical transceivers to facilitate the free-space optical communications. The line of sight may be preserved by the position or placement of the computing nodes in the system. The position or placement of the computing nodes may be achieved by using different shaped enclosures for holding the computing nodes.

20 Claims, 5 Drawing Sheets

(51) Int. Cl.
  *H04B 10/516* (2013.01)
  *H04B 10/66* (2013.01)

(56) References Cited

U.S. PATENT DOCUMENTS

| | | | |
|---|---|---|---|
| 10,491,302 B1* | 11/2019 | Morris | G06F 1/20 |
| 2004/0156640 A1* | 8/2004 | Dress | H04B 10/801 |
| | | | 398/140 |
| 2008/0008471 A1* | 1/2008 | Dress | G06E 3/006 |
| | | | 398/118 |
| 2008/0008472 A1* | 1/2008 | Dress | H04B 10/803 |
| | | | 398/118 |
| 2012/0155885 A1* | 6/2012 | Hannah | H04B 10/1143 |
| | | | 398/128 |
| 2013/0182620 A1* | 7/2013 | Chaffee | H04J 14/06 |
| | | | 398/43 |
| 2013/0223846 A1* | 8/2013 | Joseph | H01S 5/005 |
| | | | 398/118 |
| 2015/0078383 A1* | 3/2015 | Wisehart | H04L 49/552 |
| | | | 370/392 |
| 2015/0280827 A1* | 10/2015 | Adiletta | H04L 49/40 |
| | | | 398/116 |
| 2016/0173199 A1* | 6/2016 | Gupta | H04B 10/1149 |
| | | | 398/127 |
| 2017/0069214 A1* | 3/2017 | Dupray | G08G 5/0008 |
| 2017/0237971 A1* | 8/2017 | Pitts | H04N 13/232 |
| | | | 345/419 |
| 2017/0257970 A1* | 9/2017 | Alleman | G06F 1/20 |
| 2019/0235929 A1 | 8/2019 | Altstaetter et al. | |
| 2019/0327780 A1* | 10/2019 | Ganguly | H04B 10/114 |
| 2023/0125673 A1 | 4/2023 | Ballani et al. | |

OTHER PUBLICATIONS

L. Y. Lin,"Free-Space Micromachined Optical Switches for Optical Networking", Jan./Feb. 1999,IEEE Journal of Selected Topics in Quantum Electronics, vol. 5, No. 1,pp. 1-3.*

Arsalan Saljoghei,"MCF-SMF Hybrid Low-Latency Circuit-Switched Optical Network for Disaggregated Data Centers", Aug. 15, 2019, Journal of Lightwave Technology, vol. 37, No. 16,pp. 4017-4020.*

Navid Hamedazimi,"FireFly: A Reconfigurable Wireless Data Center Fabric Using Free-Space Optics",Aug. 17-22, 2014, SIGCOMM'14,http://dx.doi.org/10.1145/2619239.2626328,pp. 319-323.*

Katsuhiko Hirabayashi, "Optical Beam Direction Compensating System for Board-to-Board Free Space Optical Interconnection in High-Capacity ATM Switch", May 1997,Journal of Lightwave Technology, vol. 15, No. 5,pp. 874-876,880.*

Yao Hu, "Towards Tightly-coupled Datacenter with Free-space Optical Links", Sep. 17-19, 2017,ICCBDC 2017,Association for Computing Machinery, pp. 33-35.*

Max Curran, "Providing Line-of-Sight in a Free-Space-Optics Based Data Center Architecture", May 22-27, 2016,2016 IEEE International Conference on Communications (ICC)—Optical Networks and Systems, pp. 1-6.*

Farrington, et al., "Helios: A Hybrid Electrical/Optical Switch Architecture for Modular Data Centres", in Proceedings of ACM SIGCOMM Computer Communication Review, vol. 40, Issue 4, Aug. 30, 2010, pp. 339-350.

Imran, et al., "HOSA: Hybrid Optical Switch Architecture for Data Center Networks", In Proceedings of the 12th ACM International Conference on Computing Frontiers, May 18, 2015, 8 Pages.

Wang, et al., "c-Through: Part-Time Optics in Data Centers", in Proceedings of ACM SIGCOMM Computer communication Review, vol. 40, Issue 4, Aug. 30, 2010, pp. 327-338.

"International Search Report and Written Opinion Issued in PCT Application No. PCT/US21/053869", dated Jan. 18, 2022, 11 Pages.

Ishii, et al., "Toward Exa-Scale Optical Circuit Switch Interconnect Networks for Future Datacenter/HPC, in Proceedings of International Society for Optics and Photonics, vol. 10131, Jan. 28, 2017, 9 Pages.

"Notice of Allowance Issued in U.S. Appl. No. 17/173,052", dated Mar. 21, 2022, 7 Pages.

"Notice of Allowance Issued in U.S. Appl. No. 17/173,052", dated Aug. 31, 2022, 5 Pages.

Fujiwara, et al., "Augmenting Low-Latency HPC Network with Free-Space Optical Links", In IEEE 21st International Symposium on High Performance Computer Architecture, Feb. 7, 2015, pp. 390-401.

"International Search Report and Written Opinion Issued in PCT Application No. PCT/US21/030770", dated Aug. 10, 2021, 14 Pages.

"Notice of Allowance Issued in U.S. Appl. No. 18/087,429", dated Jun. 7, 2023, 9 Pages.

* cited by examiner

ID="1" />

SLOPING SINGLE POINT OPTICAL AGGREGATION

CROSS-REFERENCE TO RELATED APPLICATION

This application is a continuation of U.S. patent application Ser. No. 16/917,829 filed on Jun. 30, 2020. The aforementioned application is expressly incorporated herein by reference in its entirety.

BACKGROUND

A datacenter is a physical facility that is used to house computer systems and associated components. A datacenter typically includes a large number of servers, which can be stacked in racks that are placed in rows.

One relatively recent development in datacenter technology involves disaggregation. Currently, most datacenters include a plurality of servers, with each server including one or more central processing units (CPUs) and a certain amount of memory. Disaggregation involves separating servers into their constituent processing and memory resources so that these can be allocated as required according to the needs of each workload.

Separating servers into resource components can provide additional flexibility. Workloads, especially in commercial datacenters, can vary greatly. One of the primary goals of datacenter operation is having enough resources to cover peak demand, yet not under-utilize those same resources during non-peak conditions. Disaggregation increases the chances of being able to supply sufficient resources during time periods of high demand while also ensuring optimal utilization.

In order to achieve disaggregation, the interconnections between the computing resources should provide high bandwidth and low latency, similar to the high bandwidth and low latency provided by the communication interfaces inside a traditional server. This can be a challenge for a datacenter that has a large number of computing nodes that should be interconnected.

SUMMARY

In accordance with one aspect of the present disclosure, a system is disclosed for using free-space optics to interconnect a plurality of computing nodes. The system includes a plurality of optical modules coupled to the plurality of computing nodes and a plurality of optical transceivers that facilitate free-space optical communications with the plurality of optical modules. Each optical module of the plurality of optical modules has a line of sight to an area including one or more optical transceivers of the plurality of optical transceivers. The system also includes a router that is coupled to the plurality of optical transceivers and that is configured to route the free-space optical communications among the plurality of computing nodes using the line of sight.

The plurality of computing nodes may be positioned horizontally relative to the area and the plurality of optical modules may be coupled to a top portion of the computing nodes.

The plurality of computing nodes may be positioned vertically relative to the area and the plurality of optical modules may be coupled to an edge portion of the computing nodes.

The plurality of computing nodes may be positioned at an angle relative to the area and the plurality of optical modules may be coupled to an edge portion of the computing nodes or a top portion of the computing nodes.

The plurality of computing nodes may be positioned using a combination of a horizontal position, a vertical position, or an angled position.

Each optical module among the plurality of optical modules may include a modulator and an optics system. The modulator within a particular optical module may be configured to modulate a light beam received from at least one light source to produce a modulated light beam. The optics system within the particular optical module may be configured to direct the modulated light beam toward an optical transceiver among the plurality of optical transceivers using the line of sight.

In accordance with another aspect of the present disclosure, a system is disclosed for using free-space optics to interconnect a plurality of computing nodes. The system includes a plurality of optical modules coupled to the plurality of computing nodes and a plurality of optical transceivers that facilitate free-space optical communications with the plurality of optical modules. Each optical module of the plurality of optical modules has a line of sight to an area including one or more optical transceivers of the plurality of optical transceivers. The system also includes an enclosure with a plurality of openings. Each opening of the plurality of openings holds a computing node of the plurality of computing nodes in a position to provide the line of sight for the optical module of the computing node to the area. The system also includes a router that is coupled to the plurality of optical transceivers and that is configured to route the free-space optical communications among the plurality of computing nodes using the line of sight.

The plurality of openings of the enclosure may be angled in a cone shape.

The plurality of openings of the enclosure may create a circle.

The plurality of computing nodes may be placed in the enclosure in a vertical or upward position and the plurality of optical modules may be coupled to an edge portion of the computing nodes.

The plurality of openings of the enclosure may be angled and the plurality of computing nodes may be placed in the enclosure in an upward position with the plurality of optical modules coupled to an edge portion of the computing nodes.

The plurality of openings of the enclosure may be horizontal and spaced apart from one another in a stepping pattern.

The system may further include a plurality of optical transceivers coupled to the plurality of computing nodes. The plurality of optical transceivers may have the line of sight to the area including the one or more optical transceivers of the plurality of optical transceivers and the optical transceivers may be used for the free-space optical communications.

The plurality of computing nodes may have a common shape or size.

In accordance with another aspect of the present disclosure, a system is disclosed for using free-space optics to interconnect a plurality of computing nodes. The system includes a plurality of optical modules electrically coupled to a plurality of computing nodes. The plurality of optical modules are located on a portion at a distance separate from the computing node. The system also includes an enclosure with a plurality of openings. Each opening of the plurality of openings holds a computing node of the plurality of computing nodes. The system also includes a plurality of optical transceivers that facilitate free-space optical communications with the plurality of optical modules. Each optical module of the plurality of optical modules may have a line of sight to an area including one or more optical transceivers of the plurality of optical transceivers. The system also includes a router that is coupled to the plurality of optical transceivers and that is configured to route the free-space optical communications among the plurality of computing nodes using the line of sight.

Each of the plurality of optical modules may be positioned individually to provide the line of sight to the area.

The plurality of openings of the enclosure may be horizontal and the plurality of computing nodes may be in a horizontal position.

The plurality of openings of the enclosure may be angled and the plurality of computing nodes may be in an angled position.

The plurality of openings of the enclosure may be vertical and the plurality of computing nodes may be in a vertical position.

The plurality of optical modules may be positioned using a micromachine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. Understanding that the drawings depict some example implementations, the implementations will be described and explained with additional specificity and detail through the use of the accompanying drawings in which.

DETAILED DESCRIPTION

Figure 1:
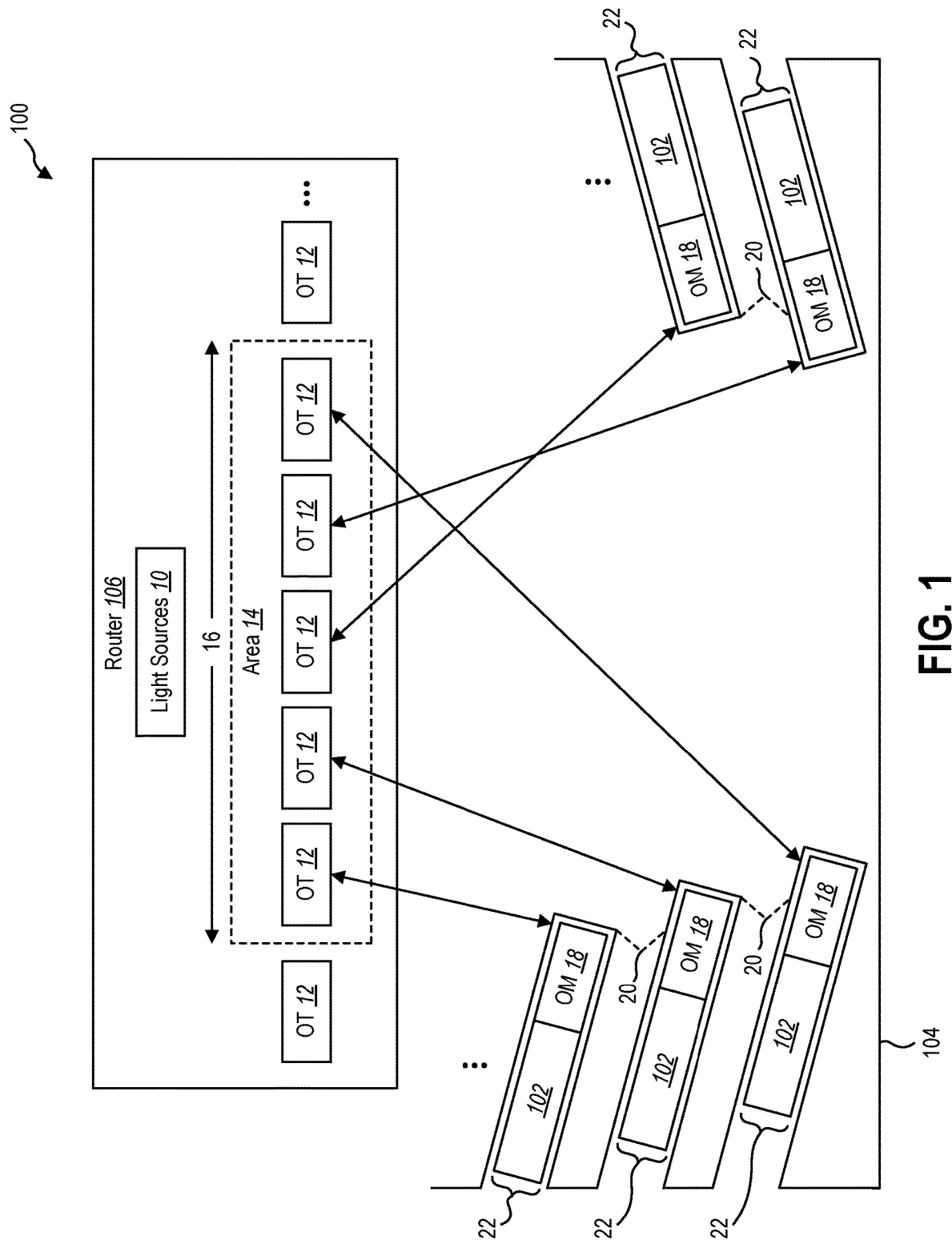
FIG. 1 illustrates an example system for using free-space optics with a plurality of computing nodes in an angled position in accordance with an implementation of the present disclosure.

The present disclosure is generally related to a line of sight between two points used for optical communications.

One type of network topology that can be used to provide high bandwidth and low latency interconnections between computing resources is sometimes referred to as a network fabric. In this type of architecture, computing resources can be deployed in a relatively small number of highly interconnected layers. Unlike traditional multi-tier architectures, a network fabric effectively flattens the network architecture, thereby reducing the distance between endpoints.

In theory, a network fabric that provides high bandwidth and low latency can be achieved using wired connections. However, in a datacenter that includes a large number of computing nodes, a massive number of wired connections would be required to provide this kind of network topology. Therefore, it is impractical to use wired connections to interconnect a large number of computing nodes in a way that provides high bandwidth and low latency.

The present disclosure may use free-space optics to create a network fabric that interconnects a large number of computing nodes. Free-space optics is an optical communication technology that uses light propagating in free space to transmit data between two points. Free-space optical communications are typically carried out with two systems that each include an optical transceiver. An optical transceiver can include an optical transmitter and an optical transceiver to provide full duplex (bi-directional) capability. An optical transmitter can include a light source (e.g., a laser, a light-emitting diode, an infrared-remitting diode) and a modulator. The modulator can be configured to vary one or more properties of the light beams that are produced by the light source with a modulating signal that includes data to be transmitted. Modulated light beams can be transmitted through the atmosphere to the optical receiver. An optical receiver can include a photodetector and a demodulator. The photodetector can be configured to convert the modulated light beams into an electrical signal, and the demodulator can be configured to demodulate the electrical signal in order to extract the transmitted data.

Advantageously, the use of free-space optics enables the network fabric to have high bandwidth and low latency. At the same time, the use of free-space optics eliminates the need to utilize a massive number of wired connections to achieve the desired high bandwidth and low latency, which may be impractical (as noted above).

In some implementations, the techniques disclosed herein can be utilized in a disaggregated computing system. In a disaggregated computing system, computing resources can be separated into dedicated nodes, such as processing nodes, memory nodes, storage nodes, etc. The various types of nodes that are utilized in a computing system may be referred to herein generally as computing nodes. In a disaggregated system, the term "computing node" can refer to a processing node, a memory node, a storage node, and/or another type of node that is utilized by a computing system.

In an implementation, a router coupled to a plurality of optical transceivers and a plurality of computing nodes coupled to optical modules may communicate using free-space optics. Free-space optical communications can occur between the optical modules that are electrically coupled to the computing nodes and the optical transceivers that are coupled to the router. In some implementations, for each optical modulator that is coupled to a particular computing node, there is a corresponding optical transceiver at the router. Free-space optical communications that are sent by an optical modulator at a computing node can be received by the corresponding optical transceiver at the router, and vice versa.

The router can be configured to route free-space optical communications among the computing nodes in the system. In other words, different computing nodes can communicate with each other through the router. Thus, the router, the optical transceivers coupled to the router, and the optical modulators coupled to the computing nodes can all function together to interconnect the computing nodes so as to form a network fabric.

The present disclosure may preserve a line of sight between the optical transceivers in a router and the optical modules of the computing nodes used for free-space optics. The optical modules may be capable of receiving free-space communications. In an implementation, the optical modules may not include light sources. As such, the light sources may be remote from the optical modules and the optical modules may include a modulator that is configured to modulate light beams received, and an optics system for reflecting the modulated light beams back toward the router. In another implementation, the optical modules may include the light sources. For example, the optical modules may include an optical transceiver. The line of sight may be an unobstructed straight path between the optical transceivers in a router and the optical modules of the computing nodes. Each of the computing nodes may be positioned or arranged so that the optical modules of the computing nodes may have a line of sight to a single area, or common focal point, of the optical transceivers in a router. As such, the line of sight may provide a clear field of view enabling data transmission using light propagation between the optical modules of the computing nodes and the optical transceivers of a router.

The relative position of the computing nodes with respect to the area or common focal point of the transceivers may be achieved by a shape of the enclosure (e.g., rack or other structure) that supports or otherwise holds the computing nodes. Thus, instead of using a traditional compute rack, the present disclosure may use different shaped enclosures for holding the computing nodes. By modifying a shape of the enclosure, the same shape and size of computing nodes may be used within the enclosures while positioning the computing nodes so that each of the optical modules of the computing nodes has a direct line of sight to the area, or common focal point, of the optical transceivers in the router. Thus, the configurations of the computing nodes may be the same and common computing nodes may be used throughout the enclosures without having to custom design the computing nodes to achieve the line of sight.

In an implementation, the enclosure may include angled slots or openings so that the computing nodes may be placed into the slots or openings at an angle. Angling the computing nodes may allow each of the optical modules of the computing nodes a direct line of sight to the area, or common focal point, of the optical transceivers in the router. Each computing node may have a different angle relative to other computing nodes so that the optical modules for each of the computing nodes has a clear line of sight to the optical transceivers in the router. By angling the computing nodes, the present disclosure may optimize a density of computing nodes in a network by increasing a number of computing nodes in the network, while maintaining a line of sight between each of the optical modules for each computing node and the area, or common focal point, of the optical transceivers in the router.

In another implementation, a line of sight between one or more optical transceivers in a router and the optical modules in the computing nodes may be achieved by spacing the different computing nodes apart from each other. The different computing nodes may remain perpendicular to the optical transceivers in the router while spaced apart from each other. As such, the computing nodes may be placed into an enclosure in a flat position and the space between the different computing nodes may allow the optical modules for each of the computing nodes to have a direct line of sight to an area, or common focal point, of the optical transceivers in the router.

In another implementation, the optical module may be on a portion separate from the computing node. The line of sight between the optical modules of the computing nodes and the area, or common focal point, of the optical transceivers in a router may be achieved by individually positioning and/or angling the separate portion with the optical module. For example, micromachines may adjust the angle and/or position of the separate portion. Thus, the computing nodes may be placed into an enclosure in one position and the separate portion with the optical modules may be angled or positioned to have a line of sight to an area, or common focal point, of the optical transceivers in the router.

By modifying a relative position of the computing nodes, or a relative position of the optical modules of the computing nodes, with respect to the optical transceivers in the router, a line of sight may be preserved for each of the optical modules in the computing nodes to an area, or common focal point, of the transceivers in the router. Having a clear line of sight between the optical modules of the computing nodes and the optical transceivers of a router, data transmission using light propagation may allow free-space optical communications to occur between the computing nodes and the router.

FIG. 1 illustrates an example of a system 100 for using free-space optics to interconnect a plurality of computing nodes 102 in accordance with an implementation. The system 100 may be a disaggregated computing system that, includes a plurality computing nodes 102. The computing nodes 102 may include processing nodes and/or memory nodes. In addition, the computing nodes 102 may also include optical modules 18. The optical modules 18 may be coupled to the computing nodes 102 in any location on the computing nodes 102. In the depicted system 100, the optical modules 18 are coupled to a top portion of the computing nodes 102.

In addition, the light sources 10 that generate light beams for sending free-space optical communications from the computing nodes 102 to the router 106 are located at a distance from the computing nodes 102. In other words, the computing nodes 102 are not coupled to optical transceivers that include light sources. Instead, the computing nodes 102 are coupled to optical modules 18 that do not include light sources.

Other implementations for use with system 100 may include light sources located on the computing nodes 102. In these implementations, the optical modules 18 may include optical transceivers that include light sources 10 for sending free-space optical communications from the computing nodes 102 to the router 106.

The plurality of computing nodes 102 may communicate with one or more routers 106 that are configured to route free-space optical communications among the plurality of computing nodes 102. The optical modules 18 of the computing nodes 102 may receive free-space optical communications from the router 106. The router 106 may include one or more light sources 10 that generate light beams and aim the light beams at the optical modules 18 of the computing nodes 102. Each optical module 18 can include a modulator that is configured to modulate light beams received from the router 106, and an optics system for reflecting the modulated light beams back toward the router 106. The optical modules 18 may be configured in many different ways in accordance with the present disclosure. Many different types of optical components can be used in the optics system, such as mirrors, lenses, gratings, etc.

The light source(s) 10 are shown within the router 106. Light source(s) 10 may include, but are not limited to, a laser, a light-emitting diode, an infrared-remitting diode. Alternatively, the light source(s) 10 may be separate from the router 106. In some implementations, the light source(s) 10 may be separate from the router 106 and also coupled to the router 106. In some implementations, the light source(s) 10 can be separate from the router 106 and not coupled to the router 106.

The router 106 may also include a plurality of optical transceivers 12. The optical transceivers 12 may be used by the router 106 for data transmission with the computing nodes 102 using light propagation. The router 106 may aim, or otherwise direct, light beams to the corresponding optical transceivers 12 and optical modules 18.

In some implementations, the system 100 may be configured so that for each optical module 18 there is a corresponding optical transceiver 12 that is coupled to the router 106 and that is optically coupled to the optical module 18. In some implementations, the system 100 may be configured so that optical modules 18 may communicate with a plurality of optical transceivers 12 that are coupled to the router 106. For example, different optical transceivers 12 may be used for different wavelengths. As such, the optical modules 18 may direct light beams to one or more optical transceivers 12.

In an implementation, the plurality of optical transceivers 12 may be subdivided into an area 14, or a common focal point, where the light beams from all of the optical modules 18 may be directed. The area 14 may include a subset 15 of optical transceivers 12. The width 16 of the area may be proportional to the number of computing nodes 102 in system 100. As such, as the number of computing nodes 102 increases in system 100, the width 16 of area 14 may increase, causing the number of optical transceivers 12 in the subset 15 of optical transceivers 12 increase. In addition, as the number of computing nodes 102 decreases in system 100, the width 16 of area 14 may decrease, causing the number of optical transceivers 12 in the subset 15 of optical transceivers 12 to decrease.

Each of the computing nodes 102 may be positioned or arranged relative to the area 14 so that each of the modules 18 may have a direct line of sight to the area 14. The line of sight to area 14 may be a straight path free of obstructions. As such, the line of sight may provide a clear field of view across area 14 enabling data transmission between the subset 15 of optical transceivers 12 and the optical modules 18 using free-space optical communications.

While a single area 14 is depicted in system 100, the optical transceivers 12 may be subdivided into a plurality of areas 14. As such, different optical modules 18 may have a direct line of sight to different areas 14 within router 106. Moreover, the optical modules 18 may have a direct line of sight to more than one area 14 within router 106.

As depicted in system 100, the line of sight between the computing nodes 102 and the area 14 is achieved by angling the computing nodes 102 relative to each other. The computing nodes 102 may be arranged in a slopping pattern such that the lowest computing nodes 102 are closer together and the computing nodes 102 become further apart near the top of a stack of computing nodes 102. In addition, the angle 20 between each computing node 102 varies and higher angles 20 may become steeper relative to the lower angles 20. The different angles 20 between computing nodes 102 may remain narrow to keep the focal length constant among the optical field. By having a slight angling change between the computing nodes 102, each optical module 18 of the computing nodes 102 may have a direct line of sight to the light sources 10 and/or the area 14.

While the computing nodes 102 are depicted as being aligned at an angle, the computing nodes 102 may in any position, such as, but not limited to, aligned horizontally, aligned vertically, and/or aligned at any number of intermediate positions relative to the area and/or the ground. The different positions of computing nodes 102 may be used to provide a direct line of sight to the light sources 10 and/or the area 14 of router 106. In addition, the computing nodes 102 may be aligned in any combination of positions. For example, a portion of the computing nodes 102 may be aligned at an angle, while a portion of the computing nodes 102 may be aligned horizontally. Another example may include a portion of the computing nodes 102 may be aligned vertically, while a portion of the computing nodes 102 may be aligned at an angle. Another example may include a portion of the computing nodes 102 may be aligned vertically, while a portion of the computing nodes 102 may be aligned horizontally, and another portion of the computing nodes 102 may be aligned at an angle. As such, the computing nodes 102 may be arranged in a variety of positions to achieve a clear line of sight to the light sources 10 and/or the area 14 of router 106.

The computing nodes 102 may be located within an enclosure 104. The enclosure 104 may include, hut is not limited to, a rack, or other support structure, for the computing nodes 102. In an implementation, the enclosure 104 may be a tank, such as a tank that can be utilized in a cryogenic computing system (which array be referred to herein as a cryogenic tank). Cryogenic computing systems may be designed to operate at extremely low temperatures, as such, the computing nodes 102 that operate in cryogenic computing systems can be located in tanks that are cooled to the desired temperature(s).

The relative position of the computing nodes 102 with respect to the area 14 may be achieved by a shape of the enclosure 104. The shape of the enclosure 104 may be any shape, such as, but not limited to a cone, a circle, an hourglass, a helix, a square, a triangle, and/or an octagon. Thus, instead of using a traditional compute rack where the computing nodes 102 may be stacked on top of one another in rows, the shape of the enclosure 104 may be modified so that when the computing nodes 102 are placed into the enclosure 104, the optical modules 18 of the computing nodes 102 may have a direct line of sight to the light sources 10 and/or the area 14 of router 106.

By modifying a shape of the enclosure 104, the computing nodes 102 used within the enclosure 104 may have a common shape and/or size while maintaining a direct line of sight to the light sources 10 and/or the area 14 of router 106. Thus, the configurations of the computing nodes 102 may be the same and common computing nodes 102 may be used throughout the enclosure 104 without having to custom design the computing nodes 102 to achieve the direct line of sight.

As depicted in system 100, enclosure 104 may be a cone shape with one or more slots or openings 22 arranged in a slopping pattern. The computing nodes 102 may be positioned in the openings 22. The angle 20 between each opening 22 may vary and higher angles 20 may become steeper relative to the lower angles 20. By having a slight angling change between the openings 22, the line of sight between each optical module 18 of the computing nodes 102 to the light sources 10 and/or the area 14 of the router may be preserved. As such, the computing nodes 102 may be in a cascading pattern. The angles 20 may be adjusted to create a direct line of sight between each of the optical modules 18 and the light sources 10 and/or the area 14 of router 106. For example, the angles 20 may be adjusted to maintain a perpendicular position of the optical modules 18 relative to the light sources 10 and/or the area 14. In addition, the angles 20 may be adjusted to increase or decrease a number of computing nodes 102 in system 100. As such, by angling the computing nodes 102, enclosure 104 may optimize a density of the computing nodes 102 by increasing and/or decreasing a number of computing nodes 102 in system 100, while maintaining a direct line of sight between the optical modules 18 of the computing nodes 102 and the light sources 10 and/or the area 14.

The router 106, the optical transceivers 12 that are coupled to the router 106, and the optical modules 18 may function together to interconnect the computing nodes 102 to form a network fabric. The network fabric in the depicted system 100 enables all of the computing nodes 102 to be accessible to one another. For example, all of the memory nodes of each computing node 102 may be accessible to all of the processing nodes of each computing node 102 via the network fabric.

By modifying a relative position of the computing nodes 102 so that the computing nodes 102 have a clear line of sight to the light sources 10 and/or the subset 15 of optical transceivers 12 in the area 14 of the router 106, data transmission using light propagation may allow free-space optical communications to occur in system 100.

Figure 2A:
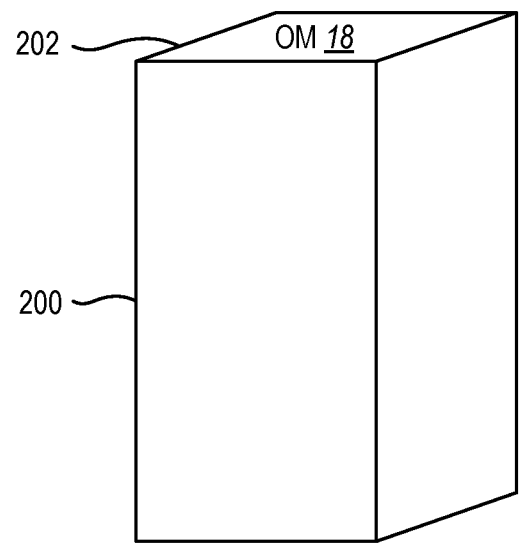
FIG. 2A illustrates an example of a computing node with an optical module coupled to an edge portion of the computing node in accordance with an implementation of the present disclosure.
Figure 3:
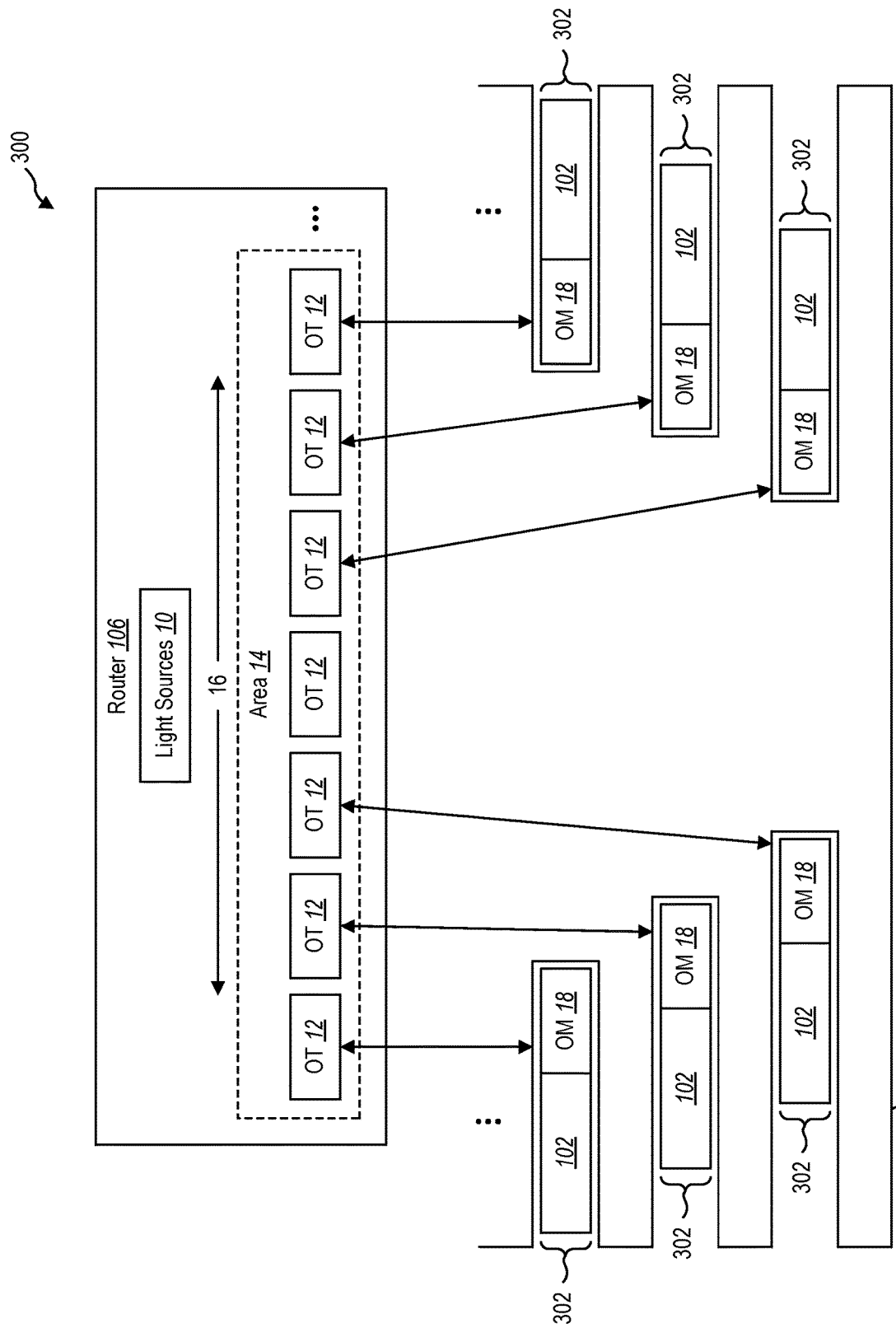
FIG. 3 illustrates an example system for using free-space optics with a plurality of computing nodes in a flat position in accordance with an implementation of the present disclosure.
Figure 4:
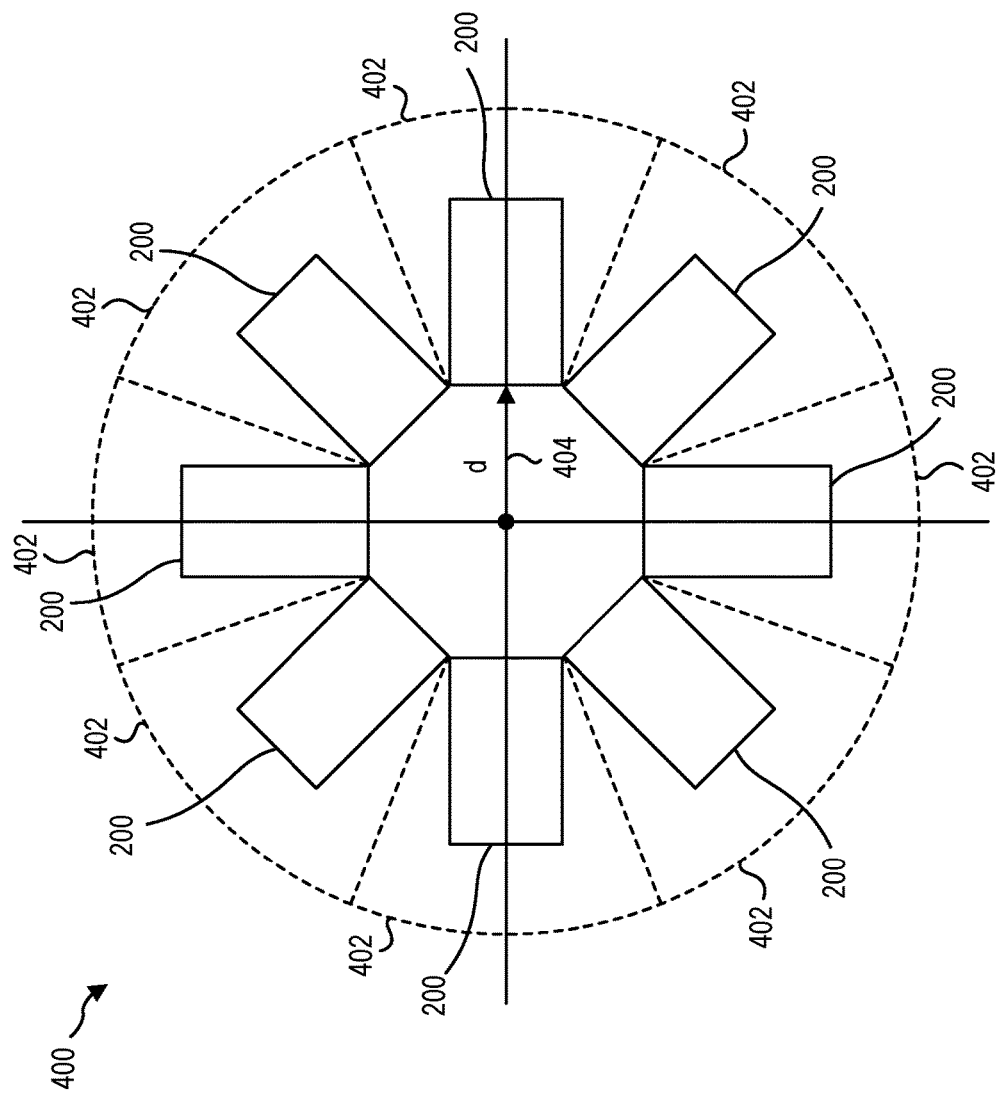
FIG. 4 illustrates a top view of an example enclosure with a plurality of computing nodes in a vertical position arranged in a circle in accordance with an implementation of the present disclosure.
Figure 5:
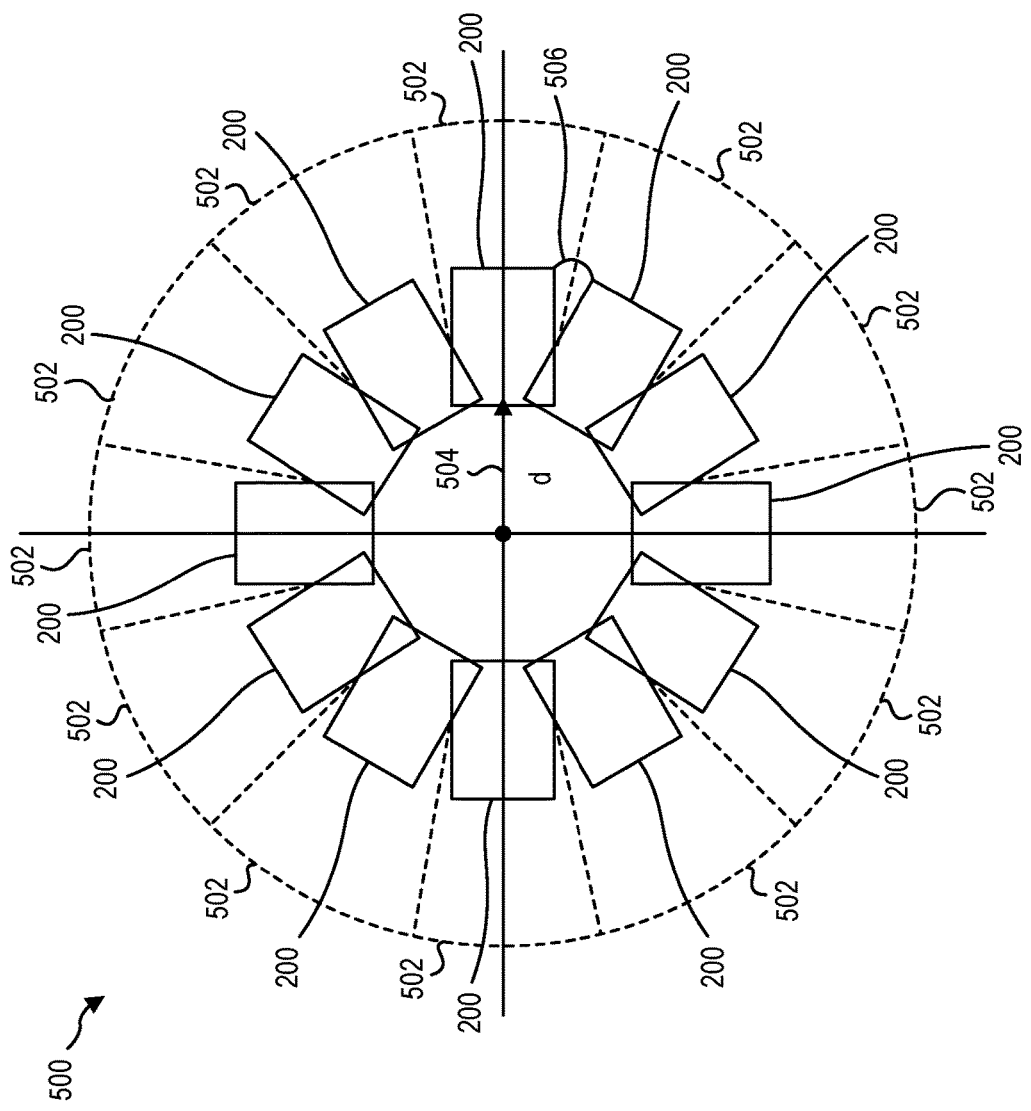
FIG. 5 illustrates a top view of an example enclosure with a plurality of computing nodes in an angled position arranged in a circle in accordance with an implementation of the present disclosure.

Referring now to FIG. 2A, illustrated is an example of a possible implementation of a computing node 200 that may be used with system 100 or the other systems and/or the enclosures described in FIGS. 3-5. The computing node 200 may include an optical module 18 coupled to an edge portion 202 of the computing node 200. Thus, instead of the optical module 18 being coupled to a top portion of the computing node 200, as illustrated in FIG. 1, the optical module 18 is coupled to an edge portion 202 of the computing node 200.

By having the optical module 18 coupled to an edge portion 202, the computing node 200 may be placed in different positions, such as, a vertical or upward position, with the edge portion 202 directed upwards towards the light source(s) 10 (FIG. 1) and/or a subset 15 (FIG. 1) of optical transceivers 12 (FIG. 1) in an area 14 (FIG. 1) of a router 106 (FIG. 1).

The optical module 18 can be configured in many different ways in accordance with the present disclosure. Many different types of optical components can be used in the optics system, such as mirrors, lenses, gratings, etc.

In an implementation, light sources may be located on the computing nodes 102. Optical transceivers that include light sources for sending free-space optical communications from the computing node 200 to the router 106 may be included on the edge portion 202.

Figure 2B:
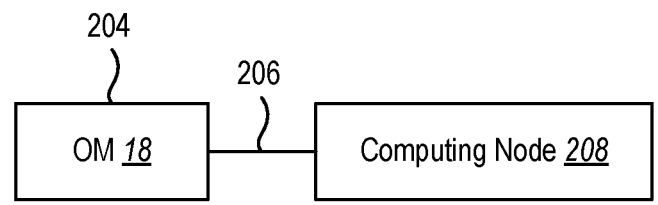
FIG. 2B illustrates an example of a computing node with an optical module in a separate portion from the computing node in accordance with an implementation of the present disclosure.

Referring now to FIG. 2B, illustrated is an example of a possible implementation of a computing node 208 that may be used with system 100 or the other systems and/or the enclosures described in FIGS. 3-5. The computing node 208 may include the optical module 18 in a portion 204 separate from the computing node 208. A connection 206 may couple the portion 204 to the computing node 208. The connection 206 may be an electrical connection, such as, but not limited to, a wired connection. The optical module 18 may access the computing node 208 via the connection 206. Similarly, the computing node 208 may access the optical module 18 via the connection 206. Thus, the optical module 18 may be separate from the processing nodes and/or memory nodes of the computing node 208.

The portion 204 may be angled separately from the computing node 208 so that the optical module 18 may have a direct line of sight to the light source(s) 10 (FIG. 1) and/or a subset 15 (FIG. 1) of optical transceivers 12 (FIG. 1) in an the area 14 (FIG. 1) of a router 106 (FIG. 1). The optical modules 18 on each computing node 208 may be individually positioned and/or angled to ensure a direct line of sight. For example, micromachines may adjust the angle and/or position of the portion 204 so that the optical modules 18 has a clear line of sight. Micromachines may include, but are not limited to, any device or machine constructed on a microscopic scale. One example of a micromachine may include a microelectromechanical systems (MEMS) device. As such, the computing nodes 208 may be placed into an enclosure in one position and the portion 204 with the optical modules 18 may be angled or positioned to have a line of sight to the area 14 of the router 106.

In an implementation, a traditional rack may be used with the computing node 208 and the portion 204 may be positioned and/or angled so that the optical module 18 may have the a clear line of sight to the light sources 10 and/or the subset 15 of the optical transceivers 12 in the area 14. For example, the computing node 208 may be placed horizontally in the rack and the portion 204 may be positioned and/or angled separately from the computing node 208 to achieve the line of sight.

In another implementation, the different shaped enclosures discussed herein may be used with computing node 208 and the portion 204 with the optical module 18 may be adjusted, if necessary, to ensure the optical module 18 has a clear line of sight. For example, the computing node 208 may be placed at an angle in the enclosure and additional positioning and/or angling of the portion 204 may occur to achieve a line of sight to the light sources 10 and/or the subset 15 of the optical transceivers 12 in the area 14.

The optical module 18 can be configured in many different ways in accordance with the present disclosure. Many different types of optical components can be used in the optics system, such as mirrors, lenses, gratings, etc.

In an implementation, light sources may be located on the computing nodes 208. Optical transceivers that include light sources for sending free-space optical communications from the computing node 208 to the router 106 may be included on the portion 204 separate from the computing node 208.

Referring now to FIG. 3, illustrated is an example system 300 for using free-space optics to interconnect a plurality of computing nodes 102 in a flat position in accordance with an implementation. System 300 is similar to the example system 100 that was discussed in connection with FIG. 1. System 300 illustrates another example of the arranging of the computing nodes 102 to ensure a clear line of sight between the optical modules 18 of computing nodes 102 and the light sources 10 and/or the subset 15 of optical transceivers 12 in the area 14, or common focal point, of the router 106 to enable free-space optical communications.

A line of sight between the optical modules 18 and the light sources 10 and/or the area 14 of the router 106 may be achieved by offsetting the computing nodes 102 to space the computing nodes 102 apart from one another. The computing nodes 102 may remain in a horizontal position perpendicular to the router 106. As such, the offset between the computing nodes 102 may be greater causing the width of area 14 to increase to ensure the light beams from all of the optical modules 18 have a direct line of sight to the area 14 free from obstructions. Fewer number of computing nodes 102 may be used in the system 300 since the offsets may be larger in the system 300 and the number of computing nodes 102 capable of being used in system 300 may be constrained by a width of the enclosure.

The width 16 of the area may increase and/or decrease in response to the number of computing nodes 102 in system 100. As such, as the number of computing nodes 102 increases in system 100, the width 16 of area 14 may increase, causing the number of optical transceivers 12 in the subset 15 of optical transceivers 12 increase. In addition, as the number of computing nodes 102 decreases in system 100, the width 16 of area 14 may decrease, causing the number of optical transceivers 12 in the subset 15 of optical transceivers 12 to decrease.

The relative position of the computing nodes 102 with respect to the area 14 may be achieved by a shape of the enclosure 304. Enclosure 304 may include a plurality of slots or openings 302 arranged in a stepping pattern such that the lowest computing nodes 102 are closer together and the computing nodes 102 become further apart near the top of a stack of computing nodes 102. While the computing nodes 102 are depicted as aligned horizontally, the computing nodes 102 may be aligned in any position and/or any combination of positions relative to the area and/or the ground. The different positions of computing nodes 102 may be used to provide a direct line of sight to the light sources 10 and/or the area 14 of router 106. For example, a portion of the computing nodes 102 may be aligned horizontally, while a portion of the computing nodes 102 may be aligned at an angle.

As such, the computing nodes 102 may be placed into the openings 302 in a horizontal position while maintaining a direct line of sight to the light sources 10 and/or the subset 15 of optical transceivers 12 in the area 14 of the router 106 so that data transmission using light propagation may allow free-space optical communications to occur in system 300.

Referring now to FIG. 4, illustrated is a top view of an example enclosure 400 for use with systems 100 and 300 discussed in FIGS. 1 and 3. Enclosure 400 may be used instead of the enclosures 104 and/or 304 described in FIGS. 1 and 3. Enclosure 400 may also be used in combination with the enclosures 104 and/or 304. This figure may be discussed below with reference to the architectures of FIGS. 1 and 3.

The enclosure 400 may be in a shape of a circle and may include a plurality of slots or openings 402 arranged in a circle so that when the computing nodes 200 are placed into the slots or openings 402, the computing nodes 200 are in a circular shape. The computing nodes 200 may slide in radially into the openings 402 in a vertical or upward position relative to the area 14 and/or the ground.

The example computing node 200 discussed in FIG. 2A may be used with the enclosure 400 where the optical module 18 is coupled to an edge portion of the computing node 102. By having the optical module coupled to an edge portion of the computing node 200, the optical module 18 may aim upward towards the light sources 10 and/or the subset 15 of optical transceivers 12 in the area 14 of the router 106 placed above the enclosure 400, as illustrated in FIGS. 1 and 3.

While a single ring of computing nodes 200 is depicted in FIG. 4, multiple rings of computing nodes 200 may be included in enclosure 400. The rings may be one computing node 200 deep. By placing the computing nodes 200 into the enclosure 400 in a vertical or upward position, more computing nodes 200 may be included in each ring. As such, a number of rings included in enclosure 400 may be reduced while maintaining a same number of computing nodes 200, or increasing the number of computing nodes 200, in enclosure 400. For example, instead of a rack with 40 rows, enclosure 400 may have 5 rings while maintaining the same number of computing nodes 200, or increasing the number of computing nodes 200, that a rack generally houses.

Each ring may have a different diameter 404 so that the rings are offset from each other. Thus, lower rings may have a larger diameter 404 relative to higher rings. By offsetting the rings from each other, the optical modules 18 of the computing nodes 200 in the lower rings may have a direct line of sight to the light sources 10 and/or the subset 15 of optical transceivers 12 in the area 14 of the router 106.

By aligning the computing nodes 200 vertically, the number of computing nodes 200 that may have a direct line of sight to the light sources 10 and/or the subset 15 of optical transceivers 12 in the area 14 may increase. As such, more computing nodes 200 may be packed into enclosure 400. Moreover, the size of the enclosure 400 may be smaller since the computing nodes 200 are aligned vertically instead of horizontally.

Referring now to FIG. 5, illustrated is an example enclosure 500 for use with systems 100 and 300 discussed in FIGS. 1 and 3. Enclosure 500 may be used instead of the enclosures 104, 304, and/or 400 described in FIGS. 1, 3, and 4. Enclosure 500 may also be used in combination with the enclosures 104, 304, and/or 400 described in FIGS. 1, 3, and 4. This figure may be discussed below with reference to the architectures of FIGS. 1 and 3.

The enclosure 500 may be in a shape of a circle and may include a plurality of slots or openings 502 arranged at an angle in a circular shape so that when the computing nodes 102 are placed into the slots or openings 502, the computing nodes 102 may overlap each other and fan out slightly from one another in a circular shape. The computing nodes 102 may slide in radially into the openings 502 in an upward position relative to the area 14 and/or the ground.

The computing nodes 200 may be slightly angled so that the angle 506 between the computing nodes 200 may vary slightly. By having a slight angle change between the computing nodes 200, the line of sight between each optical module 18 of the computing nodes 200 to the light sources 10 and/or the subset 15 of optical transceivers 12 in the area 14 may be preserved.

The example computing node 200 discussed in FIG. 2A may be used with the enclosure 500 where the optical module 18 is coupled to an edge portion of the computing node 200. By having the optical module coupled to an edge portion of the computing node 200, the optical module 18 may be aimed upward with a clear line of sight to the light sources 10 and/or the subset 15 of optical transceivers 12 in the area 14 of the router 106.

While a single row of computing nodes 200 is depicted in FIG. 5, multiple rows of computing nodes 200 may be included in the enclosure 500. By placing the computing nodes 200 into the enclosure 500 in an upward position, more computing nodes 200 may be included in each row. As such, a number of rows included in enclosure 500 may be reduced while maintaining a same number of computing nodes 200, or increasing the number of computing nodes 200, in enclosure 500.

By angling the computing nodes 200, each row in enclosure 500 may have the same diameter 504. The angle 506 of the computing nodes 200 may vary between the different rows so that the computing nodes 200 in lower rows may fan out at a larger angle 506 relative an angle 506 of the computing nodes 200 in rows higher up in enclosure 500. In addition, by having the same diameter 504, the density of the number of computing nodes 200 included in enclosure 500 may increase. As such, enclosure 500 may optimize a density of the computing nodes 102 in enclosure 500, while maintaining a direct line of sight from each of the optical modules 18 of the computing nodes 200 to the light sources 10 and/or the subset 15 of optical transceivers 12 in the area 14 of the router 106.

In some implementations, a "network fabric" refers to a computer network architecture in which a plurality of computing systems or computing nodes are interconnected. In some implementations, the computing systems or computing nodes in a network fabric can be interconnected using routers, switches, and other kinds of network components. In some implementations, the computing systems or computing nodes in a network fabric can be interconnected in a way that provides low latency and/or high bandwidth interconnections between the various computing systems or computing nodes. In some implementations, the computing systems or computing nodes in a network fabric can be interconnected using relatively few layers (e.g., two or three layers). This essentially flattens the network architecture, thereby reducing the distance between endpoints.

In some implementations, two components are "coupled" if they are electrically coupled, optically coupled, or mechanically coupled.

In some implementations, two components are "electrically coupled" if electrical current can flow from one component to another. In some implementations, two electrically coupled components can be in direct contact with each other such that current flows from the one component directly to the other component. However, this is not required. In some implementations, two electrically coupled components may not be in direct contact with each other. There may be any number of other conductive materials and components disposed electrically between two components that are electrically coupled so long as current can flow therebetween.

In some implementations, two optical components are "optically coupled" if there is an optical path between the two optical components. Thus, in such implementations, a first optical component (e.g., optical module 18 and/or a node optical transceiver) can be considered to be optically coupled to a second optical component (e.g., a router optical transceiver 12) if an optical transmission sent by the first component is received by the second optical component.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element or feature described in relation to an implementation herein may be combinable with any element or feature of any other implementation described herein, where compatible.

The described implementations are to be considered as illustrative and not restrictive, and the present disclosure may be embodied in other forms besides those specifically described herein. The scope of the disclosure is, therefore, indicated by the appended claims rather than by the foregoing description. Changes that come within the meaning and range of equivalency of the claims are to be embraced within their scope.

What is claimed is:

1. A system for using free-space optics to interconnect computing nodes, comprising:
   an enclosure including a plurality of openings, the plurality of openings being configured to receive a plurality of computing devices;
   a first computing device including a first computing node and a first optical module coupled to the first computing node, the first computing device being placed within a first opening of the plurality of openings, wherein placing the first computing device within the first opening causes the first optical module to have lines of sight with each optical transceiver from a first set of optical transceivers on a router; and
   a second computing device including a second computing node and a second optical module coupled to the second computing node, the second computing device being placed within a second opening of the plurality of openings, wherein placing the second computing device within the second opening causes the second optical module to have additional lines of sight with each of the optical transceivers from the first set of optical transceivers on the router.

2. The system of claim 1, wherein the first set of optical transceivers are configured to route free-space optical communications between the first computing device and the second computing device based on the first optical module and the second optical module having a line of sight with each optical transceiver from the first set of optical transceivers on the router.

3. The system of claim 1, wherein the first set of optical transceivers is a subset of optical transceivers from a plurality of optical transceivers on the router.

4. The system of claim 3, wherein the subset of optical transceivers are determined based on each transceiver from the subset of optical transceivers being within an area of a common focal point to each of the first optical module and the second optical module.

5. The system of claim 1, wherein the plurality of openings are arranged in a sloping pattern being angled away from the first set of optical transceivers such that when a computing device is placed in an opening of the plurality of openings positioned behind the first opening or the second opening, an optical module on the computing device has a line of sight with each optical transceiver from the first set of optical transceivers on the router.

6. The system of claim 1, wherein the plurality of openings are arranged in a stepping pattern such that the first opening being positioned closer to the first set of optical transceivers than the second opening facilitates the second optical module being positioned further inward from an outer surface of the enclosure than the first optical module when the first computing device is placed within the first opening and the second computing device is placed within the second opening.

7. The system of claim 1, wherein the first optical module is configured to communicate directly with a first optical transceiver of the first set of transceivers, and wherein the second optical module is configured to communicate directly with a second optical transceiver of the second set of transceivers.

8. The system of claim 1, wherein each optical module among a plurality of optical modules comprises a modulator and an optics system;
the modulator within a particular optical module is configured to modulate a light beam received from at least one light source to produce a modulated light beam; and
the optics system within the particular optical module is configured to direct the modulated light beam toward an optical transceiver on the router using a line of sight.

9. The system of claim 1, wherein at least a portion of the first opening is positioned between the second opening and the first set of optical transceivers on the router.

10. The system of claim 1, wherein one or more of the plurality of openings are adjustable such that a position or angle of the first computing device and the second computing device relative to the set of optical receivers can be adjusted.

11. The system of claim 10, wherein the one or more of the plurality of openings are adjustable using a micromachine.

12. The system of claim 1, wherein the enclosure comprises a server rack having the first computing device, the second computing device, and the router implemented thereon.

13. A method for establishing a free-space optics communication environment, the method comprising:
obtaining an enclosure including a plurality of openings, the plurality of openings being sized and configured to receive a plurality of computing devices;
placing a first computing device within a first opening of the enclosure, wherein the first computing device includes a first computing node and a first optical module coupled to the first computing node, wherein placing the first computing device within the first opening causes the first optical module to have a-lines of sight with each optical transceiver from a first set of optical transceivers on a router; and
placing a second computing device within a second opening of the enclosure, wherein the second computing device includes a second computing node and a second optical module coupled to the second computing node, wherein placing the second computing device within the second opening causes the second optical module to have additional lines of sight with each of the optical transceivers from the first set of optical transceivers on the router.

14. The method of claim 13, wherein the first set of optical transceivers are configured to route free-space optical communications between the first computing device and the second computing device based on the first optical module and the second optical module having a line of sight with each optical transceiver from the first set of optical transceivers on the router.

15. The method of claim 13, wherein the plurality of openings are arranged in a sloping pattern being angled away from the first set of optical transceivers such that when a computing device is placed in an opening of the plurality of openings positioned behind the first opening or the second opening, an optical module on the computing device has a line of sight with each optical transceiver from the first set of optical transceivers on the router.

16. The method of claim 13, wherein the plurality of openings are arranged in a stepping pattern such that the first opening being positioned closer to the first set of optical transceivers than the second opening facilitates the second optical module being positioned further inward from an outer surface of the enclosure than the first optical module when the first computing device is placed within the first opening and the second computing device is placed within the second opening.

17. The method of claim 13, wherein the first optical module is configured to communicate directly with a first optical transceiver of the first set of transceivers, and wherein the second optical module is configured to communicate directly with a second optical transceiver of the second set of transceivers.

18. The method of claim 13,
wherein each optical module among a plurality of optical modules comprises a modulator and an optics system,
wherein the modulator within a particular optical module is configured to modulate a light beam received from at least one light source to produce a modulated light beam, and
wherein the optics system within the particular optical module is configured to direct the modulated light beam toward an optical transceiver on the router using a line of sight.

19. The method of claim 13, further comprising:
placing a third computing device within a third opening of the enclosure, wherein the third computing device includes a third computing node and a third optical module coupled to the third computing node, wherein placing the third computing device within the third opening causes the third optical module to have a line of sight with each optical transceiver from the first set of optical transceivers on the router.

20. The method of claim 13, further comprising:
adjusting one or more of the first opening of the enclosure or the second opening of the enclosure to modify an angle of the first computing device or the second computing device relative to the first set of optical transceivers on the router, wherein adjusting the one or more of the first opening of the enclosure or the second opening of the enclosure is performed using a micromachine.

* * * * *